United States Patent [19]
Gorka et al.

[11] 3,716,221
[45] Feb. 13, 1973

[54] FUSING DEVICE

[75] Inventors: Donald J. Gorka, Mahtomedi; Harold B. Laskin, Brighton, both of Minn.

[73] Assignee: Minnesota Mining and Manufacturing Company, St. Paul, Minn.

[22] Filed: Jan. 4, 1971

[21] Appl. No.: 103,725

[52] U.S. Cl. .............................................. 118/60
[51] Int. Cl. ........................ G03g 13/20, G03g 15/20
[58] Field of Search .............. 263/6 R, 6 E; 219/388

[56] References Cited

UNITED STATES PATENTS

| | | |
|---|---|---|
| 3,498,596 | 3/1970 | Moser .................................. 263/6 E |
| 3,449,548 | 6/1969 | Adamek et al. ..................... 263/6 E X |
| 3,291,466 | 12/1966 | Aser et al. ............................ 263/6 E |
| 3,452,181 | 6/1969 | Stryjewski .......................... 263/6 E X |

*Primary Examiner*—Charles J. Myhre
*Attorney*—Kinney, Alexander, Sell, Seldt & Delahunt

[57] ABSTRACT

A fusing device for fusing thermoplastic resinous particulate material to a receptor sheet. The fusing device includes a fusing roller having a resilient fusing blanket supported on the periphery thereof and heating means to heat the fusing blanket to a temperature sufficient to fuse the particulate material. A backup roller is urged toward engagement with the deformable fusing blanket to press the receptor sheet carrying the particulate material into contact with the fusing roller. The fusing roller is coated with an off-set preventing liquid which is applied thereto from the backup roller at predetermined intervals during operation of the fusing device.

10 Claims, 5 Drawing Figures

INVENTORS
DONALD J. GORKA
HAROLD B. LASKIN
BY Kinney, Alexander,
Sell, Steldt & DeLaHunt
ATTORNEYS INVENTORS
DONALD J. GORKA
HAROLD B. LASKIN
BY Kinney, Alexander,
Sell, Steldt & DeLaHunt
ATTORNEYS INVENTORS
DONALD J. GORKA
HAROLD B. LASKIN
BY Kinney, Alexander,
Sell, Steldt & DeLaHunt
ATTORNEYS

FUSING DEVICE

BACKGROUND OF THE INVENTION

This invention relates to an improved fusing device for fusing thermoplastic particulate material to a receptor sheet supporting said material.

The use of thermoplastic resin material in particulate form for the purpose of forming images on paper in office copying machines or the like has generated various devices for adhering the particulate material to the receptor sheets. It is necessary that the particulate resin material, hereinafter referred to as ink or developer powder, be fused or changed to a tacky state such that it can adhere to the receptor sheet, and upon subsequent cooling will be bonded to the receptor sheet to form the image thereon. It is important that in fixing the inks to the receptor sheet that the same are not disturbed as far as location of a receptor sheet or that they are not off-set such that they do not distort the character of the image. Fusing devices which have been utilized for this purpose have previously included a heated fusing roller and a backup roller and the receptor sheet bearing the thermoplastic ink has been advanced between the nip area of the rollers to fuse and apply the ink permanently to the substrate. These devices have varied in configuration and have utilized a surface treatment on the heated fusing roller to avoid offsetting, such as by the direct application onto the fusing roller of a film of silicone oil to prevent the ink from offsetting to the fusing roller as the inks are passed between the nip area of the rolls. Such a structure is illustrated in U.S. Pat. No. 3,331,592.

In the fusing device illustrated in the above-identified U. S. Pat. the silicone oil film is applied to the fusing roller and the backup roller is provided with a deformable coating on the outer periphery thereof. The backup roller is mounted on rocking members which are moved from a first position where the periphery of the backup roller is out of contact with the fusing roller to a second position affording pressure contact with the fusing roller. The two rollers are driven to move the material between the nip area of the rollers. This structure requires the mechanical movement of the backup roller out of contact with the fusing roller when not in operation to prevent a compression set in the deformable coating on the backup roller which would disturb the subsequent operation of the fuser. Further, with the presence of the thermoplastic inks in the machine and the objectionable offsetting of these powders during the fusing process to the surfaces of both rollers, there is frequently a transfer of these powders to subsequent receptor sheets. The device of this patent is related to as an improved construction of a direct contact fusing device for toner images and other related prior art patents include U.S. Pat. Nos. 3,324,791; 3,291,466; 3,499,548 and 3,435,500.

The device constructed according to the present invention affords a simplified fusing device and avoids the objections of the presently known fusing systems.

The fusing drum of the device herein disclosed has a flat surface area which at the rest position of the fusing roller is in opposed relation to the backup roller such that no mechanical movement of the backup roller into and out of contact with the fusing roller is required upon each cycle to fuse the inks to each receptor sheet. The fusing roller is provided with a coating having a durometer between 15 and 50 such that a resilient surface contacts the surface of the receptor sheet supporting the particulate ink rather than having the particulate materials contact a hardened surface. In the device of the present invention the backup roller is also coated with a film of silicone oil to pick up the stray ink particles which might be present. This roller then is continually cleaned by a cleaning device circumferentially spaced and trailing the nip between the rollers such that any powder which may accidentally be present on its periphery is removed to avoid a build-up of particulate material on the hard surface of the backup roller. This prevents transfer to the fusing roller or to the back side of the receptor sheet.

The backup roller also provides a means for transferring a film of silicone oil to the deformable surface of the fusing roller after a predetermined number of fusing operations have been completed to improve the release characteristic of the surface of the fusing roller.

SUMMARY OF THE INVENTION

The fusing device of the present invention for fixing a thermoplastic resin material onto a receptor sheet includes a pair of rotatably mounted rollers including a fusing roller having a heating means for heating the peripheral surface thereof to a temperature sufficient to fuse the developer powder and a backup roller biased into engagement with the fusing roller. The fusing roller is provided with a flat surface area which is positioned in opposed relation to the backup roller in a rest position. Means are provided for limiting the contact between these rollers such that there is no contact between the backup roller and the flat area of the drum when the rollers are at the rest position. The fusing roller is provided with a blanket having an outer deformable coating upon which may be applied a thin coat of offset preventing liquid. The offset preventing liquid is applied to the surface of the fusing roller from the surface of the backup roller at predetermined intervals during operation of the fusing device. The offset preventing liquid also serves to aid in cleaning the backup roller to avoid a buildup of material on the backup roller. A cleaning device is provided for removing any material adhered to its surface due to the presence of the silicone oil.

The advantages of the device constructed in accordance with the present invention will be more fully understood after reading the following description which refers to the accompanying drawing.

The Drawing

Figure 1:
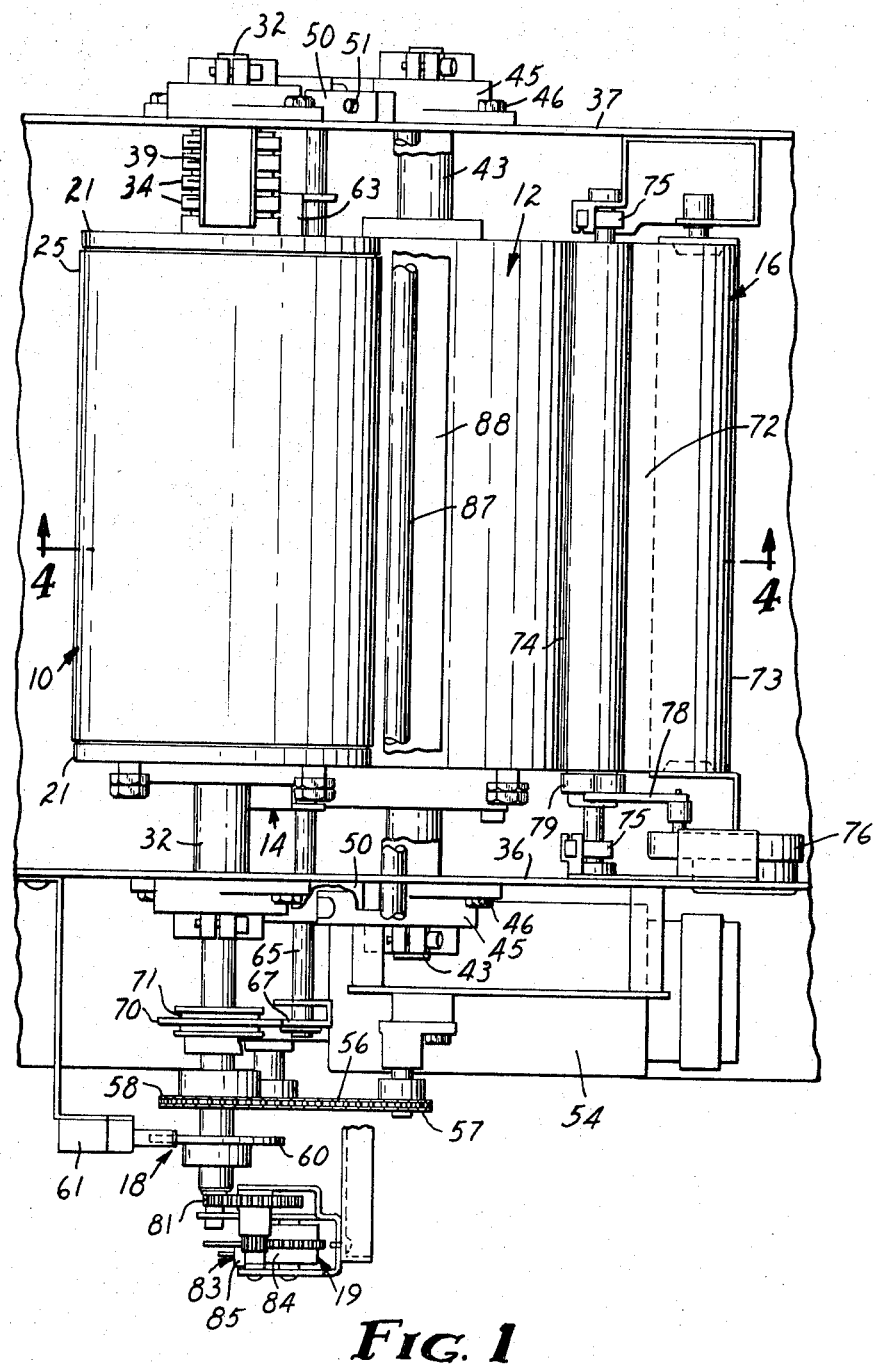
FIG. 1 is a top plan view of a developer powder fusing apparatus constructed in accordance with the present invention and partially in section.

Referring now to the drawing there is illustrated a developer powder fusing apparatus constructed in accordance with the present invention including a fusing roller 10, a backup roller 12, a toner offset preventing fluid applicator 14, a backup roller cleaner 16 and two timing cam and switch combinations 18 and 19 for controlling the operation of the fuser.

The fusing roller 10 comprises a hollow aluminum drum 21 having a flat area on its external surface through about a 40° arcuate extent and along its length except for a narrow area at each end defining drive flanges at the ends of the drum. A flexible heating blanket 23 is secured to the interior surface of the drum 21 to provide sufficient heat on the surface of a fusing blanket 25 covering the drum to fuse the developer powder to the receptor sheet. The fusing blanket 25 comprises a homogeneous high temperature resilient material having a uniform cross section and a durometer of 15 to 50 bonded to a strong substrate. For example, the blanket 25 may have a layer of a silicone elastomer or a composition of a silicone elastomer with a polytetraflurolethylene filler having a durometer of about 35 and bonded to a stainless steel sheet. The blanket is wrapped around the exterior surface of the drum 21 and is secured in the flat area of the drum by tabs 26 extending from one end of the stainless steel sheet and by springs 27 connected to the ends of the fusing blanket 25. The outer peripheral surface of the blanket 25 has a normal diameter which exceeds that of any part of the drum 21 except in the flat area thereof. The fusing blanket has approximately a 15 inch circumferential extent around the curved surface of the drum 21 to permit fusing of developer powder to a 14 inch long receptor sheet during a single revolution of the fusing roller 10. Recesses 28 are formed in the drum 21 to receive the springs 27 so that the flat area of the fusing roller 10 with the fusing blanket 23 in place on the drum 21 is at a lesser radius than the remaining portion of the fusing blanket 25.

An end plate 30 is secured to each end of the fusing drum 21 and a shaft 32 extends through the drum 21, is secured to one of the end plates 30 and extends coaxially from each end plate 30. A series of four ring electrical connectors and appropriate spacers are fit over one end of the shaft 32 and secured to one end plate 30 of the fusing drum 21 to provide electrical connection to the heating blanket 23 and a temperature sensor (not shown) in the interior of the fuser drum 21. Each of the ends of the fusing drum shaft 32 extends through one of a pair of parallel main support walls 36 and 37 of a frame means where it is bearinged for free rotation of the fuser drum 21. A series of four stationary brushes are mounted on a bracket 39 secured to the rear support wall 37 and provide electrical connection through the ring electrical connectors 34 to the heating blanket 23 and the temperature sensor in the fusing drum 21.

Figure 2:
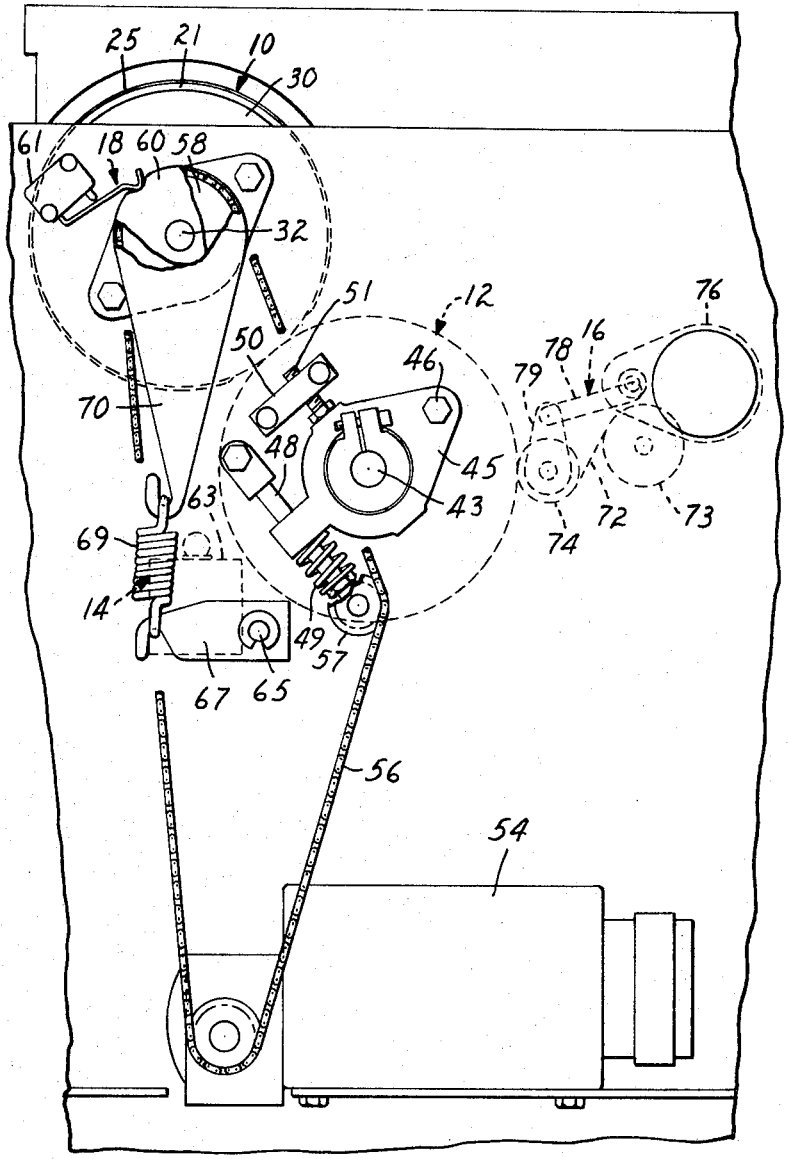
FIG. 2 is a side elevational view of the apparatus of FIG. 1 partially in section.
Figure 3:
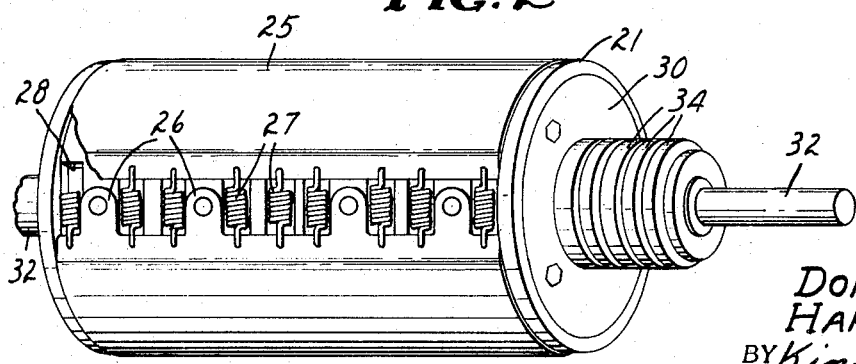
FIG. 3 is a perspective view of one part of the apparatus of FIG. 1.

The backup roller 12 comprises a hollow aluminum drum 41 with an exterior surface coating of polytetraflurolethylene providing a rigid exterior surface, end plates 42 secured to the drum 41 and a shaft 43 extending through the drum 41, secured to one of the end plates 42 and extending through the end plates coaxially with the drum 41. Each end of the backup roller shaft 43 extends through one of the main support walls 36 and 37 where it is supported parallel to the fusing roller shaft 32 by identical pivotal support fixtures 45. The support fixtures 45 journal the shaft 43 for free rotation and they are pivotally connected to the main support walls 36 and 37 by studs 46 spaced from the journals for the shaft 43. To the opposite side of the backup roller shaft 43 from each pivot stud 46, a fixture 45 is formed with an opening through which a guide rod 48 projects. As best shown in FIG. 2, the guide rods 48 are pivoted on the main support walls 36 and 37 and extend beyond the fixtures 45. As shown in FIG. 2, a compression spring 49 is fitted over a guide rod 48 to bias the pivotal fixture 45 and thereby the backup roller 12 toward the fusing roller 10. The compression springs 49 apply sufficient force to the backup roller shaft 43 to provide a fusing pressure between the fusing blanket 25 of the fusing roller 10 and the backup roller 12. Fusing pressure as used herein refers to the pressure required to force a receptor sheet into intimate contact with the fusing blanket 25.

A stop block 50 is secured to each of the main support walls 36 or 37 and is spaced from the pivotal fixture 45. A bolt 51 is threaded into each stop block 50 and the heads thereof are positioned to rest against a flattened surface on the fixtures 45 to limit travel of the pivotal fixture 45 and thereby the backup roller 12 toward the fusing roller 10. Cooperation of the bolts 51 with the fixtures 45 maintains the rollers parallel, limits the interference between the backup roller 12 and fusing roller 10 at the nip area therebetween and cooperates with the drive flanges on the fusing drum 21 so that the backup roller does not contact the flat area of the fusing roller 10.

Figure 4:
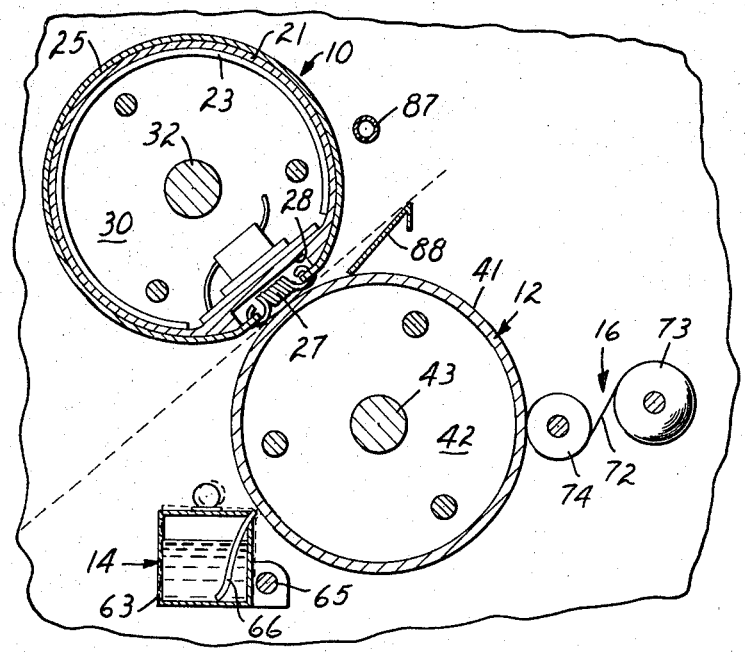
FIG. 4 is a cross-sectional view taken along line 4—4 of FIG. 1.
Figure 5:
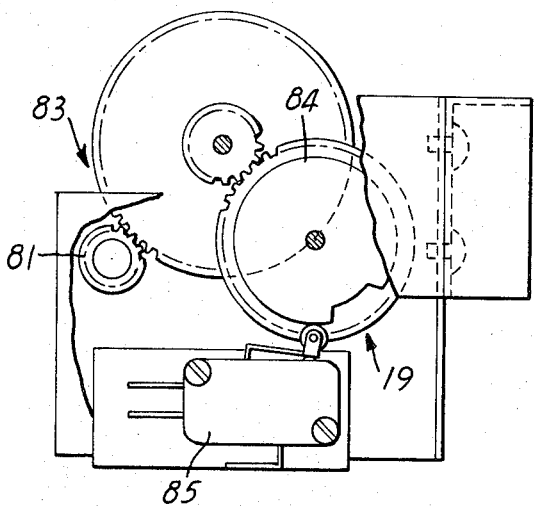
FIG. 5 is an elevation view partially in section of a second part of the apparatus of FIG. 1.

Rotation of the fusing roller 10 (in a counter-clockwise direction as viewed in FIG. 4) and the backup roller 12 (in a clockwise direction as viewed in FIG. 4) is provided by a drive motor and a chain and sprocket drive including a chain 56, a motor driven sprocket wheel, an idler sprocket wheel 57 and a sprocket wheel 58 secured to the fusing roller shaft 32. The circular flange areas at the ends of the fuser roller 10 contact the backup roller 12 when the flat portion of the fuser roller 10 faces the backup roller 12 to provide initial rotation of the backup roller when the fusing roller 10 is driven by the motor 54. A circular switching cam 60 having a detent formed in its periphery is secured to the fusing roller shaft 32 and a switch 61, supported on a subframe from the main support wall 36, is aligned with the cam 60 and has a lever arm biased against the periphery of the cam 60 to define the first timing cam and switch combination 18. The switch 61 is closed by the cam 60 except when its lever arm is biased into the depression in the periphery of the cam 60 which operationally corresponds to the flat area of the fuser roller 10 facing the backup roller 12 as illustrated in FIG. 4. Activation of the drive motor 54 is normally initiated by a copying control signal from another part of the copying machine indicating that a receptor sheet with developer powder deposited imagewise thereon is approaching the nip between the fusing roller 10 and the backup roller 12. Upon this initiation the fuser roller 10 is rotated, the circular cam 60 closes the switch 61 aNd power continues to be supplied to the motor 54. The motor continues to drive the fusing roller 10 until the lever arm of the switch 61 falls into the depression of the circular cam 60 at which time the drive motor 54 is deactivated and braked, whereby the fusing roller 10 is again in its initial rest position.

The offset preventing fluid applicator 14 comprises an elongated rectangular receptacle 63 that is pivotally supported adjacent a backup roller 12 on a shaft 65 that extends through the main support walls 36 and 37. A wick 66 extends from the fluid receptacle 63 toward the backup roller 12 along the length thereof and it is normally spaced from the backup roller 12 as illustrated in full lines in FIG. 4. Forward of the front support wall 36 the fluid receptacle support shaft 65 has an arm 67 secured to it, which arm 67 is connected through a spring 69 to a circularly apertured link 70. The aperture in link 70 fits over an eccentric cam 71 secured to the fusing roller shaft 32. In the normal rest position illustrated in the drawings the eccentric cam 71 is at its low point with respect to the fluid receptacle 63 and the wick 66 is spaced from the backup roller 12. When the fuser roller 10 is driven, the eccentric cam 71 lifts the apertured link 70 and thereby the fluid receptacle to contact the wick 66 against the backup roller 12, as illustrated in phantom lines in FIG. 4, to apply an offset preventing fluid, for example silicone oil, to the exterior surface of the backup roller 12.

The backup roll cleaner 16 comprises a supply roll 73 of a cleaning web 72, a takeup roller 74 and a drive for transferring the cleaning web 72 from the supply roll to the take-up roller 74. The cleaning web supply roll 73 and the take-up roller 74 are supported parallel to and in alignment with each other and with the backup roller 12. The shaft of the take-up roller 74 is supported at its end against rotation in slots in the support walls 36 and 37 and leaf springs 75 bias the cleaning web take-up roller 74 into contact with the backup roller 12. The cleaning web transfer drive includes a drive motor 76 which is continuously operated at a slow speed, for example 1 r.p.m., during operation of the machine. A straight link 78 is connected at one end to the drive motor shaft on a center offset from the center of said shaft to form an eccentric drive and at its opposite end to a second link 79 connected by a one-way clutch to the take-up roller 74 to provide incremental rotation of the take-up roller 74 in the take-up direction (clockwise as viewed in FIG. 1). A second one-way clutch is provided between the take-up roller 74 and its support shaft to prevent rotation of the take-up roller 74 in the unwinding direction upon rotation of the backup roller 12. Thus, in operation, the cleaning web supply motor 76, through links 78 and 79, slowly drives the take-up roller 74 in a winding direction to slowly transfer the cleaning web from the supply roller 73 to the take-up roller 74. A new cleaning surface is continuously presented to the backup roller 12 to remove the offset preventing fluid and any developer powder collected by the fluid from the backup roller 12.

A small amount of offset preventing fluid is also applied to the fusing blanket 25 of the fusing roller 10 to prevent the developer powder from adhering to the fusing blanket 25. This fluid application is controlled by the second timing cam and switch combination 19. A spur gear 81 is secured to the fuser roller shaft 32 adjacent the forward end thereof and it meshes with a gear in a reduction gear train 83 at the end of which is a circular control cam 84 formed with a depression in its periphery. The lever arm of a switch 85 is biased against the periphery of the control cam 84, the switch is normally open with its lever arm in contact with the periphery of the control cam 84, and it is closed when the end of its lever arm drops in the depression in the control cam 84. The gear train 81 provides an eleven to one reduction in rotation between the fuser roller shaft 32 and the control cam 84. When the switch 85 is closed, power is provided to the fusing roller drive motor 54 and the depression in the cam 84 is only of an extent to keep the switch 85 closed for one revolution of the fusing roller 10. Thus, rotation of the fusing roller 10 will be initiated upon completion of ten copying cycles with developer powder being fused to the receptor sheet during each of the 10 cycles. The switch 85 will then be closed and the fuser roller 10 will be driven through an eleventh revolution without receptor paper passing between the fusing roller 10 and the backup roller 12. During this eleventh revolution a film of the offset preventing fluid applied to the backup roller 12 by the applicator 14 will be transferred to the fusing blanket 25 of the fusing roller 10. it has been found that this small amount of transferred offset preventing fluid is adequate on a fusing blanket 25 of the previously recited composition to prevent the developer powder from adhering to the fusing blanket 25 during fusing of powder to 10 receptor sheets. The predetermined number of cycles preceding the coating revolution may be varied as may be required by the fusing blanket to restrict offsetting of the developer powder.

In use, the fusing roller drive motor 54 is actuated as a receptor sheet with developer powder deposited thereon in an imagewise pattern approaches the nip area between the fusing roller 10 and the backup roller 12 upward along a guide path illustrated in phantom lines in FIG. 4. When the receptor sheet reaches the nip area, the fusing roller 10 has rotated (counterclockwise as viewed in FIG. 4) to position the fusing blanket 25 in contact with the backup roller 12. Pressure is applied in the nip area between the fusing roller 10 and the backup roller 12 by the compression springs 49 biasing the pivotal backup roller support fixtures 46 and heat is applied through the fusing blanket 25 by the heating blanket 23 in the fusing drum 21 to fuse the developer powder to the receptor sheet. The receptor sheet then continues along its straight line path away from the fuser and out of the machine. An air knife 87 preferably directs a stream of air against the fusing roller 10 and a stripping and guide blade 88 is preferably positioned adjacent the backup roller 12, both positioned to operate on a receptor sheet passing between the fusing roller 10 and the backup roller 12 to prevent the receptor sheet from adhering to either roller 10 or 12. When the fusing roller 10 completes one revolution and returns to its normal rest position the lever arm of switch 61 is biased into the depression in switching cam 60, power is removed from the drive motor 54 and the motor is braked.

As the fusing roller 10 begins its rotation the eccentric cam 71 carried on its shaft 32 cams the offset preventing fluid wick 66 into contact with the backup roller 12 to apply the offset preventing fluid to the backup roller during its entire revolution. When the fusing roller 10 returns to its rest position the eccentric cam 71 returns to its low position and the offset preventing fluid wick 66 returns to its normal position spaced from the backup roller 12. As previously noted the cleaning web drive motor 76 is continuously driven at a slow speed and a fresh portion of the cleaning web is presented to the backup roller 12 and driven in a direction opposite that of the roller 12 to remove the offset preventing fluid 14 and any developer powder or other debris accumulated thereon.

Through spur 81, rotation of the fusing roller 10 also causes rotation of the reduction gear train 83 and thereby the control cam 84. After 10 revolutions of the fusing drum 10 during which developer powder is fused to receptor sheets the end of the lever arm of switch 85 drops into the depression in the periphery of control cam 84 to continue rotation of the fusing roller through an additional revolution during which offset preventing fluid is transferred from the backup roller 12 to the fusing blanket 25 of the fuser roller 10. The fuser is then ready to fuse developer powder to 10 more receptor sheets.

The control circuit for the fuser drive is also provided with switches to energize the motor at different periods depending upon the length of the receptor sheets. As the leading edge of a sheet having a 14 inch length approaches the fuser the fusing roller begins rotation to place the lead edge in contact with the blanket at a line about one-half inch from the edge of the flat surface area of the roller. With successive receptor sheets having an 11 inch length the fuser will rotate to contact the leading edge of one sheet at the same position as with the longer sheet, but with alternate sheets rotation begins a bit earlier so that the leading edge of the sheet is contacted at a line approximately 3½ inches from the edge of the flattened area. This avoids a buildup of offset preventing liquid on any area of the fusing blanket 25 when the shorter receptor sheets are continuously used.

The developer powders to be fused to the receptor sheet in the fusing system of this invention are thermoplastic materials in particulate form with an average particle size of 7 microns. A suitable developer powder may have the following composition in percentages by weight:

44% Epon 1004
  "Epon" is the tradename for an epoxy resin
    available from Shell Chemical Corp.)
52% magnetite
4% carbon black Another suitable developer powder consists of 65% polystyrene and 35% carbon black.

The temperature at which the fusing blanket can run may vary from 50° to 200° C to convert the particular developer powder from the particulate state to the fused state at the rate of operation of the fuser desired. An insulting shoe may extend about a substantial portion of the periphery of the fusing roller to restrict heat loss and to decrease warmup time initially and between cycles.

We claim:

1. A fusing device for fixing a thermoplastic developer powder onto a receptor sheet comprising:
    frame means,
    a fusing roller rotatably mounted in said frame means, said fusing roller comprising:
        a generally cylindrical hollow drum having an axially extending flat area running substantially the length thereof,
        a covering of a resilient material extending around the periphery of said drum, and
        heating means disposed within said drum for heating the exterior surface of said resilient material sufficiently to fuse a said developer powder to a said receptor sheet,
    a pair of members supported for pivotal movement relative to said frame on an axis parallel to that of said fusing roller,
    a hard surfaced backup roller journaled by said pivotal members,
    biasing means urging said backup roller toward said fusing roller for contact with said resilient covering on said fusing drum to provide rotation of said backup roller upon rotation of said fusing roller and to provide fusing pressure in the nip area between said rollers,
    means for limiting the interference between said fusing roller and said backup roller to prevent contact of said backup roller against said flat area of said fusing roller,
    means for applying a coating of an offset preventing liquid to the surface of said resilient material, and
    drive means for rotating said fusing roller.

2. A fusing device as recited in claim 1 wherein said means for applying a coating to said surface of said resilient material includes means for applying a coating of said offset preventing liquid to the periphery of said backup roller such that upon rotation of said backup roller and said fusing roller, without the presence of a receptor sheet, said liquid is applied to the surface of said fusing roller.

3. A fusing device as recited in claim 2 including cleaning means contacting the periphery of said backup roller disposed in circumferentially spaced relation about the periphery of said backup roller from said means for applying said offset preventing liquid and the nip area between said fusing and backup rollers for removing said offset preventing liquid and any debris carried thereby from the periphery of said backup roller.

4. A fusing device as recited in claim 2 including control means for energizing said drive means for said fusing roller upon advance of a receptor sheet having the thermoplastic resin thereon toward the nip between said fusing and backup rollers, said control means including means for affording rotation of said fusing roller and said backup roller without the presence of a receptor sheet after a predetermined number of rotations of each of said rollers such that said offset preventing liquid will be transferred from said backup roller to the covered surface of said fusing roller.

5. A fusing device for fixing a thermoplastic developer powder onto a receptor sheet comprising:
    frame means,
    a fusing roller rotatably mounted in said frame means, said fusing roller comprising:
        a generally cylindrical hollow drum,
        a covering of a resilient material extending around the periphery of said drum, and
        heating means disposed within said drum for heating the exterior surface of said resilient material sufficiently to fuse a said developer powder to a said receptor sheet, a pair of members supported for pivotal movement relative to said frame on an axis parallel to that of said fusing roller, a hard surfaced backup roller journaled by said pivotal members, biasing means urging said backup roller toward said fusing roller for contact with said resilient covering on said fusing drum to provide rotation of said backup roller upon rotation of said fusing roller and to provide fusing pressure in the nip area between said rollers, means for applying a coating of an offset preventing liquid to the peripheral of said backup roller such that upon rotation of said backup roller and said fusing roller, without the presence of a receptor sheet, said liquid is transferred from the periphery of said backup roller to the surface of said fusing roller, and drive means for rotating said fusing roller.

6. A fusing device as recited in claim 5 including cleaning means contacting the periphery of said backup roller disposed in circumferentially spaced relation about the periphery of said backup roller from said means for applying said offset preventing liquid and the nip area between said fusing and backup rollers for removing said offset preventing liquid and any debris carried thereby from the periphery of said backup roller.

7. A fusing device as recited in claim 5 including control means for energizing said drive means for said fusing roller upon advance of a receptor sheet having the thermoplastic resin thereon toward the nip between said fusing and backup rollers, said control means including means for affording rotation of said fusing roller and said backup roller without the presence of a receptor sheet after a predetermined number of rotations of each of said rollers such that said offset preventing liquid will be transferred from said backing roller to the covered surface of said fusing roller.

8. A fusing device as recited in claim 5 wherein said covering of a resilient material is bonded to a substrate sheet formed of a relatively rigid material to define a fusing blanket, which fusing blanket is removably secured to said drum.

9. A fusing device as recited in claim 8 wherein said resilient material comprises a silicone elastomer.

10. A fusing device as recited in claim 8 wherein said drum of said fusing roller has an axially extending flat area running substantially the length thereof and wherein said removable fusing blanket is secured to said drum in said flat area thereof.

* * * * *